(12) United States Patent
Rehm et al.

(10) Patent No.: US 8,879,195 B2
(45) Date of Patent: Nov. 4, 2014

(54) LOGICAL BLOCK PROTECTION FOR TAPE INTERCHANGE

(71) Applicant: Silicon Graphics International Corp., Milpitas, CA (US)

(72) Inventors: Kevan Flint Rehm, Brooklyn Park, MN (US); Judith Ann Schmitz, Edina, MN (US); Joseph Carl Nemeth, Fort Collins, CO (US); John Michael Sygulla, Chippewa Falls, WI (US)

(73) Assignee: Silicon Graphics International Corp., Milpitas, CA (US)

( * ) Notice: Subject to any disclaimer, the term of this patent is extended or adjusted under 35 U.S.C. 154(b) by 0 days.

(21) Appl. No.: 13/831,751

(22) Filed: Mar. 15, 2013

(65) Prior Publication Data

US 2014/0268393 A1     Sep. 18, 2014

(51) Int. Cl.
*G11B 5/584* (2006.01)
*G06F 11/10* (2006.01)
*G11B 20/12* (2006.01)

(52) U.S. Cl.
CPC .................................. *G11B 20/1202* (2013.01)
USPC .............. 360/77.12; 360/31; 360/39; 360/53; 714/758; 714/807

(58) Field of Classification Search
None
See application file for complete search history.

(56) References Cited

U.S. PATENT DOCUMENTS

| | | | | |
|---|---|---|---|---|
| 6,681,364 | B1 * | 1/2004 | Calvignac et al. | 714/776 |
| 7,266,760 | B1 * | 9/2007 | Bain | 714/807 |
| 7,398,351 | B2 * | 7/2008 | Jaquette et al. | 711/111 |
| 7,941,727 | B2 * | 5/2011 | Greenlaw | 714/758 |
| 8,572,289 | B1 * | 10/2013 | Johnson | 709/250 |
| 2003/0023933 | A1 * | 1/2003 | Duncan | 714/807 |
| 2009/0208018 | A1 * | 8/2009 | Buckingham et al. | 380/277 |
| 2010/0293418 | A1 * | 11/2010 | Nagashima | 714/54 |
| 2012/0173952 | A1 * | 7/2012 | Kumar et al. | 714/758 |
| 2013/0055053 | A1 * | 2/2013 | Butt et al. | 714/807 |
| 2013/0282996 | A1 * | 10/2013 | Kalos et al. | 711/161 |

* cited by examiner

*Primary Examiner* — Dismery Mercedes
(74) *Attorney, Agent, or Firm* — Lewis Roca Rothgerber LLP

(57) ABSTRACT

A two part process is used for modifying records to be written and retrieved from tape devices. A record is appended with a cyclic redundancy check and a string of zeros. Submitting the entire record to tape drives which are logical block protection enabled will result in no change. For drives that are not LBP enabled, the string of zeros at the end of the record is removed. In addition to determining whether a drive is LBP compliant, a determination may be made as to whether a drive is a linear tape open drive from a particular manufacturer. Linear tape open drives may behave similarly as drives which may not be enabled with logical block protection.

16 Claims, 4 Drawing Sheets

LOGICAL BLOCK PROTECTION FOR TAPE INTERCHANGE

BACKGROUND OF THE INVENTION

1. Field of the Invention

The present invention relates data storage using LBP. In particular, the present invention relates to implementing CRC data storage techniques across many different devices.

2. Description of the Related Art

Detecting errors in data as a result of transmission, data operators, and other functions has been done with logical block detection (LBP), the technique of adding a 32-bit cyclic redundancy check (CRC) checksum to tape records, is an old technique. IBM Corporation has used this method invisibly on their a linear-tape-open (LTO) drives for years to ensure data integrity, adding the CRC to the data record before writing it to tape, then checking and stripping the CRC before returning it to the application on readback.

IBM has more recently publicized this method through a change to the T10 SCSI specification, which allows the tape drive to make the CRC visible to the application. The application now adds the CRC to the record using the IBM rules, the drive verifies it before writing it to tape, verifies it on read back, and supplies it to the application for verification after receipt. This provides "End-To-End" protection of the data from its origin before transmission. The details of computing and formatting the CRC checksum are published as part of the specification so that the application can create a CRC that the drive can verify.

The IBM implementation of LBP creates a tape interchange problem for data centers that utilize different tape devices. If a data manager adds a 32-bit CRC to its records and writes them on an old IBM drive, that drive will automatically append an additional 32-bit CRC before writing it to tape. If that tape is then placed in a new drive with the LBP feature turned on, the new drive will supply both CRC values, which is not the record that was written to tape.

Similarly, if the record with CRC is written to the new drive with LBP enabled, the record will be written to tape exactly as delivered. If it is then placed in an old drive and read, the CRC will be stripped and will not be delivered to the application. This, again, is not what was written to the tape. Other non-IBM drives (e.g. the STK T10KC) implement LBP in ways that do not create this tape interchange problem, which complicates matters. What is needed is a method for storing data to tape devices that accounts for different LBP and CRC functionality that each drive exhibits.

SUMMARY OF THE CLAIMED INVENTION

The present invention utilizes a two part process for modifying records to be written and retrieved from tape devices to ensure the records are accurate when received and written to different tape devices having different error checking methods. A record is first accessed and a cyclic redundancy check is appended to the end of the record. After appending the CRC, a string of zeros is appended to the end of the CRC as part of the record. The record, with an additional CRC and the string of zeros, may then be submitted to tape drives which are logical block protection enabled. Drives which are logical block protection (LBP) enabled will not remove any of the digits from the record. For IBM LTO drives that are not LBP enabled, the string of zeros at the end of the record is removed prior to transmitting the record, and restored after receiving the data on read back. This is done because IBM non-LBP enabled drives will add a string of zeros themselves. Thus, there would be too much information written to tape if the zeros were left in the record. Similarly, the IBM non-LBP enabled drives will strip the drive-appended zeros on read back, and would thus return too little information if the zeros were not restored to the record. In some embodiments, drives other than IBM LTO (Linear Open Tape) tape drives may behave in a manner similar to IBM LTO tape drives as described above, and will be handled in a similar manner, depending on whether these drives support LBP.

BRIEF DESCRIPTION OF THE DRAWINGS

FIG. 1 is a block diagram of a tape storage system.

DETAILED DESCRIPTION

A two part process is used for modifying records to be written and retrieved from tape devices to ensure the records are accurate when received and written to different tape devices having different error checking methods. A record is first accessed and a cyclic redundancy check is appended to the end of the record. After appending the CRC, a string of zeros is appended to the end of the CRC as part of the record. The record, with an additional CRC and the string of zeros, may then be submitted to tape drives which are logical block protection enabled. Drives which are logical block protection (LBP) enabled will not remove any of the digits from the record.

For drives that are not LBP enabled, the string of zeros at the end of the record is removed prior to sending the record, and restored after receiving the data on read back. This is done because non-LBP enabled drives will add a string of zeros themselves. Thus, there would be too much information appended to the drive if the zeros were left in the record. Similarly, the non-LBP enabled drives will strip the drive-appended zeros on read back, and would thus return too little information. In some embodiments, drives other than IBM LTO (Linear Open Tape) tape drives may behave in a manner similar to IBM LTO tape drives as described above, and will be handled in a similar manner, depending on whether these drives support LBP.

Figure 1:
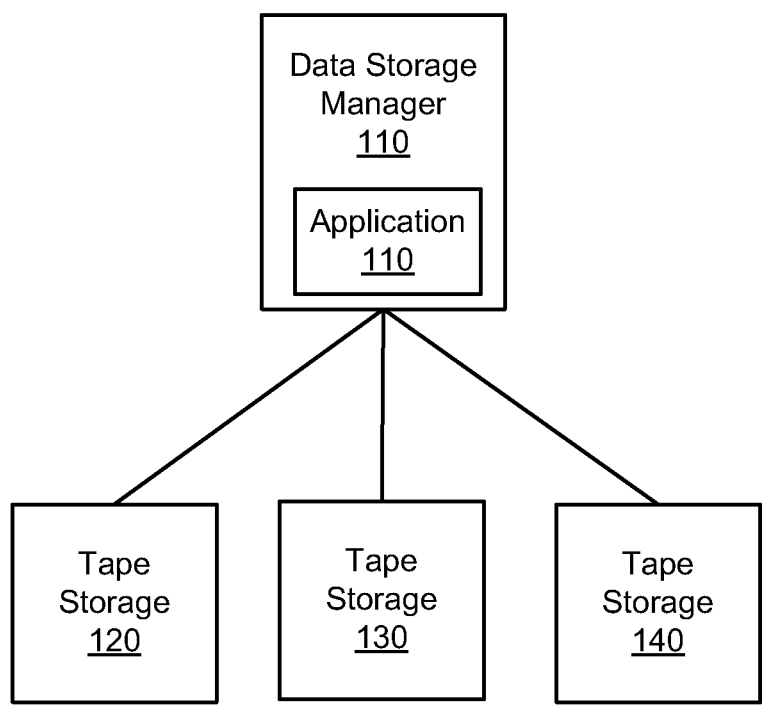
FIG. 1 is a block diagram of an exemplary system for monitoring business transactions.

FIG. 1 is a block diagram of a tape storage system. The tape storage system of FIG. 1 includes data storage manager 110, and tape storage devices 120, 130, and 140. Each tape storage device may include one or more tape devices used to store data provided by data storage manager 110. Each device within tape storage 120 may be written to or read from. The devices may be different types of devices, and may be logical block protection enabled or not. Some of the devices may be LTO drives, for example from IBM or other manufacturers.

Data storage manager 110 includes application 115. Application 115 may access tape storage devices on tape storage systems 120-140, determine whether drives within the storage systems are LBP compliant, determine if the drives are LTO drives by IBM or other manufacturers, append the records to be written and read from the drives with data, and perform other data storage management functions. Application 115 may perform the functionality described herein and is stored in memory on a data storage manager 110 and executed by a data storage manager processor.

Figure 2:
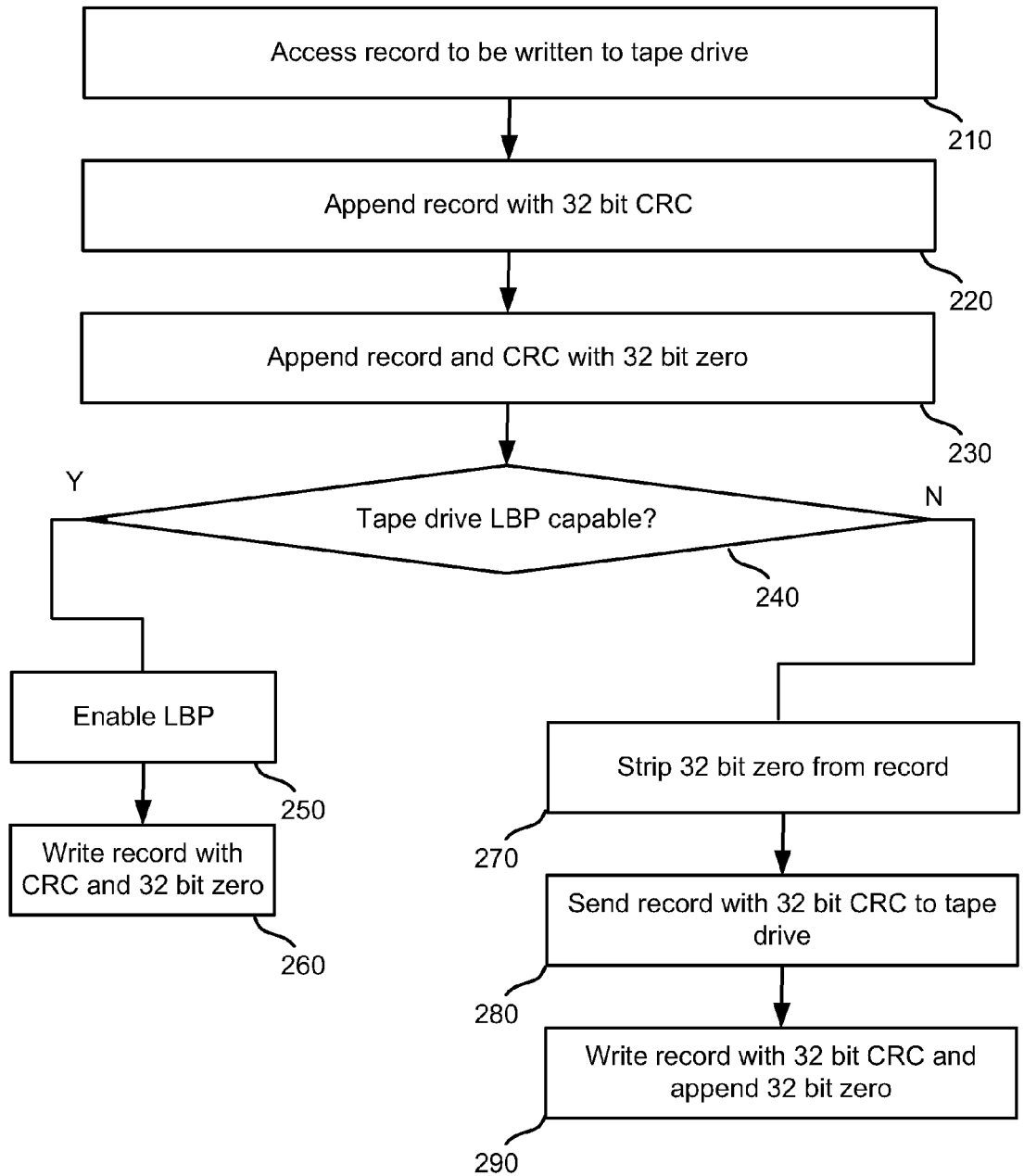
FIG. 2 is a method of writing data to a tape drive.

FIG. 2 is a method of writing data to a tape drive. The method of FIG. 2 begins with accessing a record to be written to the tape drive at step 210. Once accessed, application 115 may append the record with a 32 bit CRC at step 220. The record and CRC may then be appended further with a 32 bit zero at step 230. Next, a determination is made as to whether the tape drive to receive the data is LBP capable. If the tape drive is LBP capable at step 240, the LBP function is enabled at step 250 and the record is written to the drive with the CRC and 32 bit zero appended to the record. If the drive is an IBM LTO drive and is not LBP capable, or is any drive that behaves in a manner similar to the IBM LTO LCP-incapable tape drive, the 32 bit zero is stripped from the record. The record is then sent to the tape drive with the 32 bit CRC and the drive is recorded with the 32 bit CRC at step 290. When writing the record, the drive which is not LBP capable will typically append a 32 bit zero to the end of the record.

Figure 3:
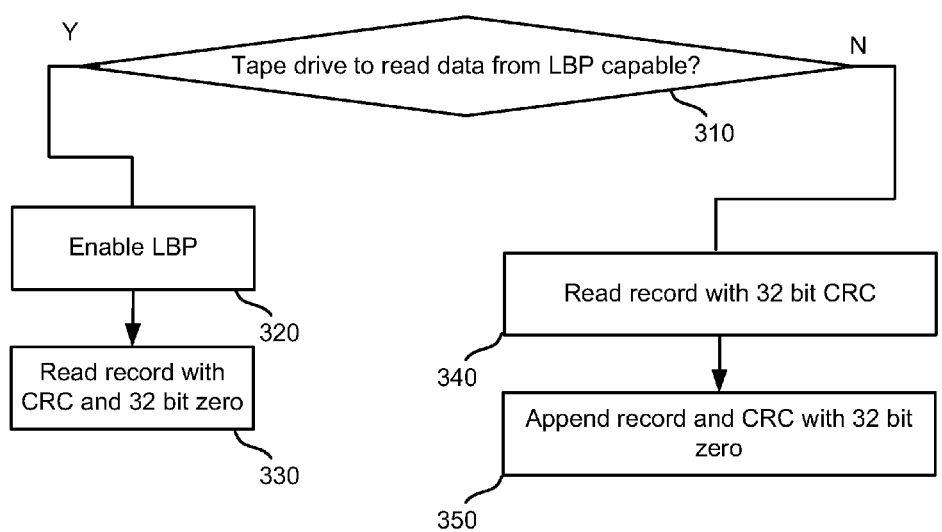
FIG. 3 is a method of reading tape from a tape drive.

FIG. 3 is a method of reading data from a tape drive. First, a determination is made as to whether the tape drive to read the data from is LBP capable at step 310. If the tape drive to read the data from is LBP capable, the LBP feature is enabled at step 320 and the record is read with a CRC and 32 bit zero appended to the record at step 330. If the tape drive to read the data from is an IBM LTO tape drive and is not LBP capable, or is any drive that behaves in a manner similar to the IBM LTO-incapable tape drive, the record may be read at step 340 and will only include a 32 bit CRC. Application 115 may then append the record and CRC with a 32 bit zero at step 350.

Figure 4:
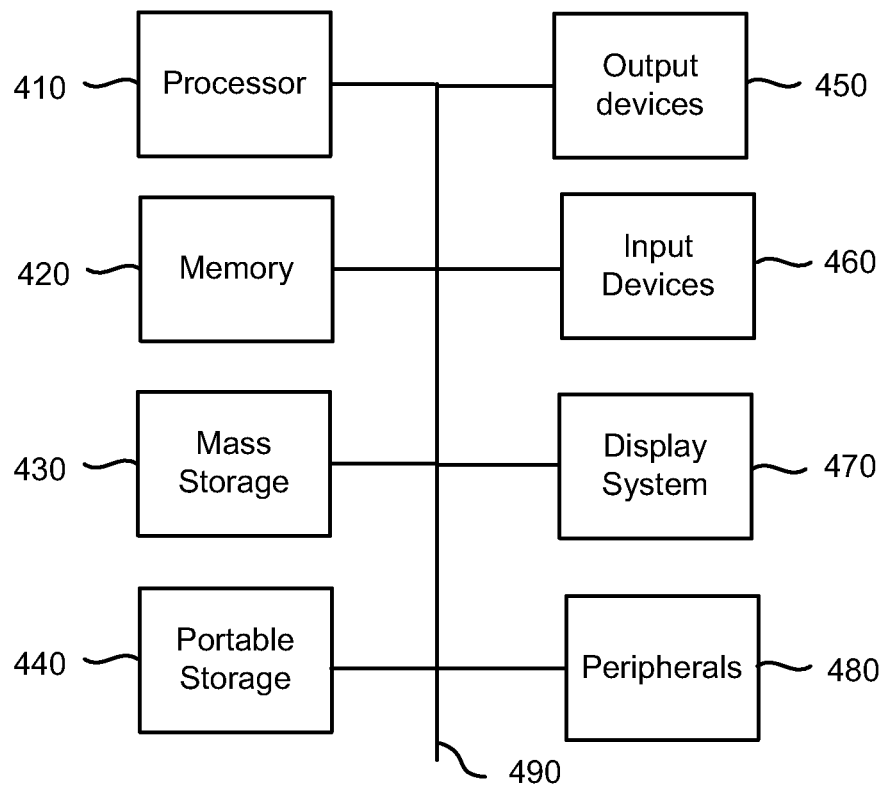
FIG. 4 is a block diagram of a computing system for implementing a data storage manager.

FIG. 4 is a block diagram of a computing system for implementing a data storage manager. The computing system 400 of FIG. 4 includes one or more processors 410 and memory 420. Main memory 420 stores, in part, instructions and data for execution by processor 410. Main memory 420 can store the executable code when in operation. The system 400 of FIG. 4 further includes a mass storage device 430, portable storage medium drive(s) 440, output devices 450, user input devices 460, a graphics display 470, and peripheral devices 480.

The components shown in FIG. 4 are depicted as being connected via a single bus 490. However, the components may be connected through one or more data transport means. For example, processor unit 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present invention for purposes of loading that software into main memory 420.

Portable storage device 440 operates in conjunction with a portable non-volatile storage medium, such as a floppy disk, compact disk or Digital video disc, to input and output data and code to and from the computer system 400 of FIG. 4. The system software for implementing embodiments of the present invention may be stored on such a portable medium and input to the computer system 400 via the portable storage device 440.

Input devices 460 provide a portion of a user interface. Input devices 460 may include an alpha-numeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Examples of suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computer system. For example, peripheral device(s) 480 may include a modem or a router.

The components contained in the computer system 400 of FIG. 4 are those typically found in computer systems that may be suitable for use with embodiments of the present invention and are intended to represent a broad category of such computer components that are well known in the art. Thus, the computer system 400 of FIG. 4 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims

What is claimed is:

1. A method for writing data to a tape drive, the method comprising:
   accessing a record to write to the tape drive;
   appending a cyclic redundancy check (CRC) to the end of the record;
   appending a string of zeros to the end of the CRC;
   detecting whether the tape drive may enable logical block protection (LBP);
   removing the string of zeros when the tape drive may not enable LBP;
   providing the record to the tape drive to be written;
   reading the record from the tape drive; and
   appending zeros to the end of the record after reading the record when the tape drive does not enable LBP.

2. The method of claim 1, further comprising enabling the tape drive for LBP.

3. The method of claim 1, wherein the CRC is thirty-two bit.

4. The method of claim 1, wherein the string of zeros is a thirty two bit zero.

5. The method of claim 1, wherein the tape drive will write the record and append a 32 bit zero when the tape drive does not enable logical block protection.

6. The method of claim 1, wherein the tape drive will write the record and not append the record when the tape drive does enable logical block protection.

7. The method of claim 1, further comprising detecting whether the tape drive is a linear-tape-open drive that will append a string of zeroes to the record; and removing the string of zeros when the tape drive is a linear-tape-open drive that will append a string of zeroes to the record.

8. The method of claim 1, wherein the tape drive will provide the record and not the string of zeros from the record when the tape drive does enable logical block protection.

9. The method of claim 1, wherein the string of zeros are not appended to the record after reading the record when the tape drive may enable LBP and when LBP is enabled on the tape drive.

10. A non-transitory computer readable storage medium having embodied thereon a program executable by a processor performing a method for writing data to a tape drive, the method comprising:
- accessing a record to write to the tape drive;
- appending a cyclic redundancy check (CRC) to the end of the record;
- appending a string of zeros to the end of the CRC;
- detecting whether the tape drive may enable logical block protection (LBP);
- removing the string of zeros when the tape drive may not enable LBP;
- providing the record to the tape drive to be written;
- reading the record from the tape drive; and
- appending zeros to the end of the record after reading the record when the tape drive does not enable LBP.

11. The non-transitory computer readable storage medium of claim 10, the program further executable to enable the tape drive for LBP.

12. The method of claim 10, wherein the CRC is thirty-two bit.

13. The non-transitory computer readable storage medium of claim 10, wherein the string of zeros is a thirty two bit zero.

14. The non-transitory computer readable storage medium of claim 10, wherein the tape drive will write the record and append a 32 bit zero when the tape drive may not enable logical block protection.

15. The non-transitory computer readable storage medium of claim 10, wherein the tape drive will write the record and not append the record when the tape drive may enable logical block protection.

16. The non-transitory computer readable storage medium of claim 10, the program further executable to detect whether the tape drive is a linear-tape-open drive that will append a string of zeroes to the record; and removing the string of zeros when the tape drive is a linear-tape-open drive that will append a string of zeroes to the record.

* * * * *